(12) United States Patent
Zhou et al.

(10) Patent No.: US 10,122,942 B2
(45) Date of Patent: *Nov. 6, 2018

(54) PHOTO SHOOTING METHOD, DEVICE, AND MOBILE TERMINAL

(71) Applicant: TENCENT TECHNOLOGY (SHENZHEN) COMPANY LIMITED, Shenzhen, Guangdong (CN)

(72) Inventors: You Zhou, Shenzhen (CN); Jia Qu, Shenzhen (CN); Yi Xie, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,320

(22) Filed: Jan. 12, 2018

(65) Prior Publication Data

US 2018/0139393 A1    May 17, 2018

Related U.S. Application Data

(63) Continuation of application No. 15/414,405, filed on Jan. 24, 2017, now Pat. No. 9,906,735, which is a
(Continued)

(30) Foreign Application Priority Data

Aug. 6, 2014 (CN) .......................... 2014 1 0384181

(51) Int. Cl.
*H04N 5/262* (2006.01)
*H04N 5/232* (2006.01)
(Continued)

(52) U.S. Cl.
CPC ....... *H04N 5/2621* (2013.01); *H04N 5/23216* (2013.01); *H04N 5/23222* (2013.01);
(Continued)

(58) Field of Classification Search
CPC ............ H04N 5/2621; H04N 5/23216; H04N 5/23293; H04N 5/265; H04N 5/2628;
(Continued)

(56) References Cited

U.S. PATENT DOCUMENTS 7,321,391 B2    1/2008  Ishige
7,855,737 B2   12/2010  Petrescu et al.
(Continued)

FOREIGN PATENT DOCUMENTS

CN    101655659 A    2/2010
CN    102216941 A   10/2011
(Continued)

OTHER PUBLICATIONS

Office Action with Translation Issued in Chinese Application No. 201410384181.2 dated Aug. 16, 2017.
(Continued)

*Primary Examiner* — Pritham Prabhakher
(74) *Attorney, Agent, or Firm* — Knobbe Martens Olson & Bear LLP

(57) ABSTRACT

A method for capturing a picture includes: capturing a first picture; overlapping the first picture with a framed image for framing a second picture, and displaying an overlapped picture, where transparency of the first picture is different from transparency of the framed image; receiving a selecting signal to select a target reserved region of the first picture, or to select a region of the framed image as a target reserved region of the second picture; capturing the second picture; and combining the target reserved region of the first picture and the second picture into one picture, or combining the first picture and the target reserved region of the second picture into one picture.

18 Claims, 11 Drawing Sheets

Related U.S. Application Data continuation of application No. PCT/CN2015/091169, filed on Sep. 30, 2015.

(51) Int. Cl.
*H04N 5/265* (2006.01)
*H04N 5/272* (2006.01)

(52) U.S. Cl.
CPC ..... *H04N 5/23293* (2013.01); *H04N 5/23296* (2013.01); *H04N 5/265* (2013.01); *H04N 5/2628* (2013.01); *H04N 5/272* (2013.01); *H04N 5/23219* (2013.01)

(58) Field of Classification Search
CPC ........... H04N 5/23222; H04N 5/23219; H04N 5/272; H04N 5/23296; G06T 19/00; G06T 19/006; G06T 7/00; G06T 15/00; G06T 15/02; G06K 9/00671; A61B 2090/365
USPC ......................................................... 348/239
See application file for complete search history.

(56) References Cited

U.S. PATENT DOCUMENTS

| | | | |
|---|---|---|---|
| 8,243,182 B2 | 8/2012 | Petrescu et al. | |
| 8,436,930 B2* | 5/2013 | Choi .................. | H04N 5/23248 348/333.05 |
| 9,466,150 B2* | 10/2016 | The ....................... | G06T 19/006 |
| 9,756,209 B2 | 9/2017 | Kim et al. | |
| 9,807,299 B2* | 10/2017 | Lin ...................... | H04N 1/3871 |
| 2005/0007468 A1 | 1/2005 | Stavely et al. | |
| 2005/0036044 A1 | 2/2005 | Funakura | |
| 2005/0179791 A1* | 8/2005 | Iga ......................... | H04N 5/232 348/231.6 |
| 2005/0204287 A1 | 9/2005 | Wang | |
| 2006/0125982 A1 | 6/2006 | Lin et al. | |
| 2006/0197851 A1 | 9/2006 | Vlahos | |
| 2009/0015702 A1 | 1/2009 | Garcia | |
| 2010/0157128 A1* | 6/2010 | Choi .................. | H04N 5/23248 348/333.03 |
| 2012/0008011 A1 | 1/2012 | Garcia | |
| 2012/0120186 A1 | 5/2012 | Diaz et al. | |
| 2012/0268552 A1 | 10/2012 | Choi et al. | |
| 2013/0235223 A1 | 9/2013 | Park et al. | |
| 2013/0293746 A1 | 11/2013 | Iki | |
| 2014/0063320 A1* | 3/2014 | Lin ....................... | H04N 1/3871 348/333.11 |
| 2014/0126028 A1 | 5/2014 | Kim et al. | |
| 2014/0232920 A1* | 8/2014 | Kim .................... | H04N 5/23219 348/333.02 |
| 2015/0062175 A1 | 3/2015 | Kim | |
| 2015/0124125 A1 | 5/2015 | Kim et al. | |
| 2015/0163399 A1 | 6/2015 | Beaurepaire et al. | |
| 2015/0178592 A1* | 6/2015 | Ratcliff ............... | H04N 5/23222 382/155 |
| 2015/0205451 A1 | 7/2015 | Lee | |
| 2015/0235630 A1* | 8/2015 | Rasmusson ............ | G09G 5/377 345/592 |
| 2015/0373480 A1 | 12/2015 | Park | |
| 2016/0314346 A1 | 10/2016 | Bigioi et al. | |
| 2017/0134667 A1 | 5/2017 | Zhou et al. | |
| 2017/0140457 A1* | 5/2017 | Kaku ....................... | G06F 3/017 |

FOREIGN PATENT DOCUMENTS

| | | |
|---|---|---|
| CN | 103491298 A | 1/2014 |
| CN | 103856718 A | 6/2014 |

OTHER PUBLICATIONS

International Search Report for Application No. PCT/CN2015/091169 dated Jan. 5, 2016.

* cited by examiner

PHOTO SHOOTING METHOD, DEVICE, AND MOBILE TERMINAL

The present application is a continuation of U.S. application Ser. No. 15/414,405, filed on Jan. 14, 2017, which is a continuation of International Application No. PCT/CN2015/091169, filed on Sep. 30, 2015, which claims priority to Chinese Patent Application No. 201410384181.2, titled "PHOTO SHOOTING METHOD, DEVICE, AND MOBILE TERMINAL" and filed on Aug. 6, 2014 with the State Intellectual Property Office of People's Republic of China. The disclosures of the aforementioned applications are hereby incorporated by reference in their entireties for all purposes.

TECHNICAL FIELD

The present disclosure relates to the field of image processing, and in particular to a method and device for capturing a picture and a mobile terminal.

BACKGROUND

Most of mobile terminals such as a smart phone, a tablet computer and an e-book reader have a function of capturing a picture. The function of capturing a picture is usually used to take a picture with multiple target objects.

For example, when taking a group picture, if nobody can help, a photographer is not in the picture. In order to take a group picture with the photographer, a current photo capturing method is that the photographer sets a camera in a self-time mode to automatically capture a picture after n seconds, then runs to the crowd and poses; n seconds later, the camera automatically takes the group picture.

Since the camera is in the self-time mode rather than photographs under the photographer's operation, the quality of the photographed picture is poor and often cannot achieve the desired effect. Furthermore, in the self-time mode, the camera needs to be configured with a fixed device such as a tripod, which is of a high demand for an implement environment.

SUMMARY

A method and device for capturing a picture are provided according to the present disclosure. The technical is described as following.

In one aspect, a method for capturing a picture is provided, which includes:
  capturing a first picture;
  overlapping the first picture with a framed image for framing a second picture, and displaying an overlapped picture, where transparency of the first picture is different from transparency of the framed image;
  wherein after displaying the overlapped picture, the method further comprises:
    receiving a selecting signal to select a target reserved region of the first picture;
    capturing the second picture; and
    combining the target reserved region of the first picture and the second picture into one picture;
  or
wherein after displaying the overlapped picture, the method further comprises:
    receiving a selecting signal to select a region of the framed image as a target reserved region of the second picture;
    capturing the second picture; and
    combining the first picture and the target reserved region of the second picture into one picture.

In second aspect, a device for capturing a picture is provided, the device includes: a capturing module, a processor and a storage medium storing operation instructions where the processor executes the operation instructions to:
    control the capturing module to capture a first picture;
    overlap the first picture with a framed image for framing a second picture, and display the an overlapped picture, wherein transparency of the first picture is different from transparency of the framed image;
    wherein after the overlapped picture is displayed, the processor executes the operation instructions to:
    receive a selecting signal to select a target reserved region of the first picture;
    capture the second picture; and
    combine the target reserved region of the first picture and the second picture into one picture;
    or
wherein after the overlapped picture is displayed, the processor executes the operation instructions to:
    receive a selecting signal to select a region of the framed image as a target reserved region of the second picture;
    capture the second picture; and
    combine the first picture and the target reserved region of the second picture into one picture.

In third aspect, a mobile terminal is provided, which includes a device for capturing a picture described in the second aspect.

With technical solutions of the present disclosure, the problem of missing a target object when taking a group picture, and the problem that a picture photographed in the self-time mode cannot satisfy the desired effect are addressed. Pictures photographed in two times may be combined into one picture by using the technical solutions of the present disclosure.

DETAILED DESCRIPTION OF THE EMBODIMENTS

To illustrate the object, the technical solutions and the advantages of the invention clear, embodiments of the invention will be described below in detail in conjunction with the drawings.

A mobile terminal mentioned in the disclosure may be a camera mobile terminal such as a mobile phone, a tablet computer, an e-book reader, a MP3 (Moving Picture Experts Group Audio Layer III) player, a MP4 (Moving Picture Experts Group Audio Layer IV) player, a portable computer and a desktop computer, etc.

Figure 1:
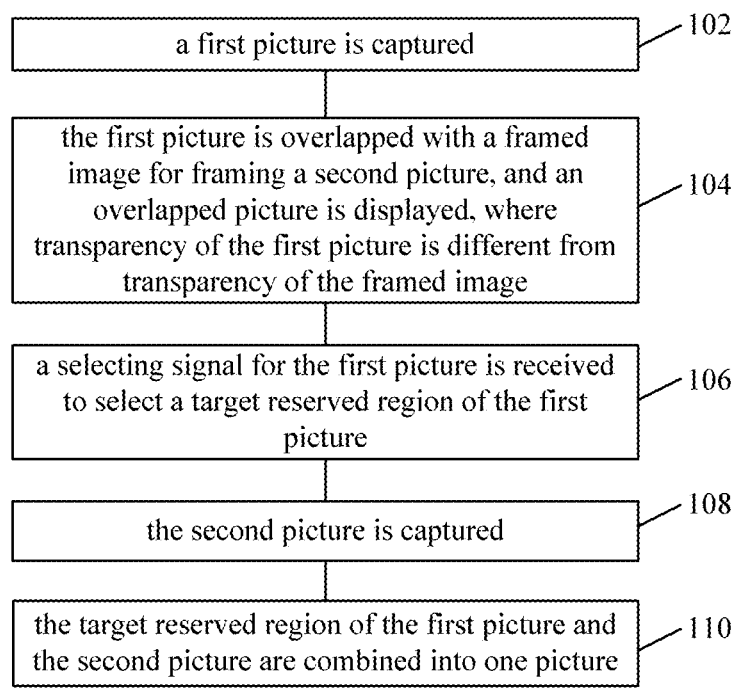
FIG. 1 is a flow chart of a method for capturing a picture according to an embodiment of the disclosure.

Reference is made to FIG. 1, which is a flow chart of a method for capturing a picture according to an embodiment of the disclosure. The method may be applied to an electronic device with a camera function such as a mobile phone and a tablet computer. The method includes steps S102 to S110.

In step S102, a first picture is captured.

In step S104, the first picture is overlapped with a framed image for framing a second picture, and an overlapped picture is displayed, where transparency of the first picture is different from transparency of the framed image.

In step S106, a selecting signal for the first picture is received to select a target reserved region of the first picture.

In step S108, the second picture is captured.

In step S110, the target reserved region of the first picture and the second picture are combined into one picture.

With the method for capturing a picture of the embodiment, the problem of missing a target object when taking a picture of multiple people, and the problem that a picture photographed in the self-time mode cannot satisfy the desired effect are addressed. Pictures photographed in two times may be combined into one picture by using the method for capturing a picture of the embodiment.

Figure 2A:
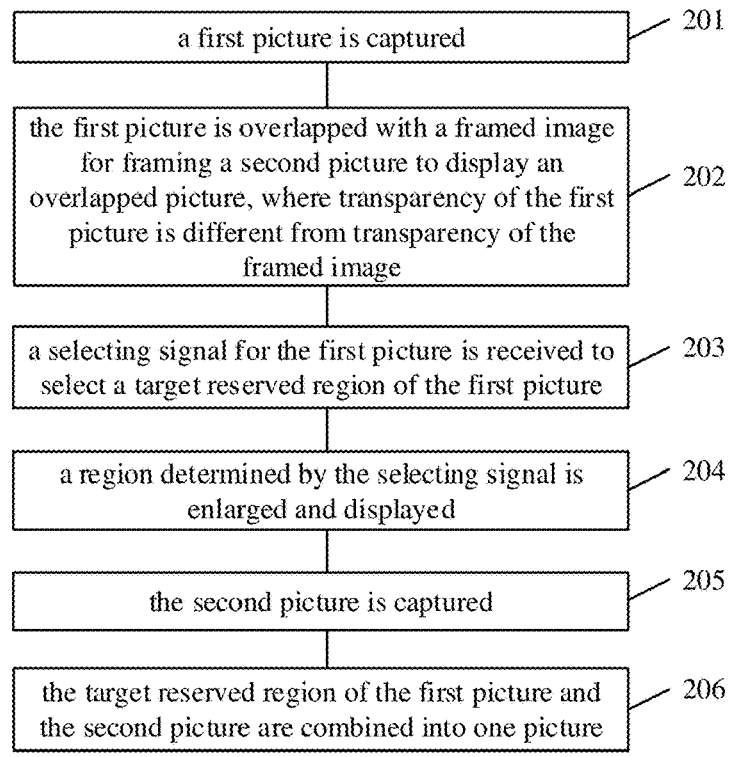
FIG. 2A is a flow chart of a method for capturing a picture according to another embodiment of the disclosure.

Reference is made to FIG. 2A, which is a flow chart of a method for capturing a picture according to another embodiment of the disclosure. The method may be applied to an electronic device with a camera function such as a mobile phone and a tablet computer. The method includes steps S201 to S206.

In step S201, a mobile terminal captures a first picture.

The mobile terminal first captures the first picture according to an operation of a user A.

Figure 2B:
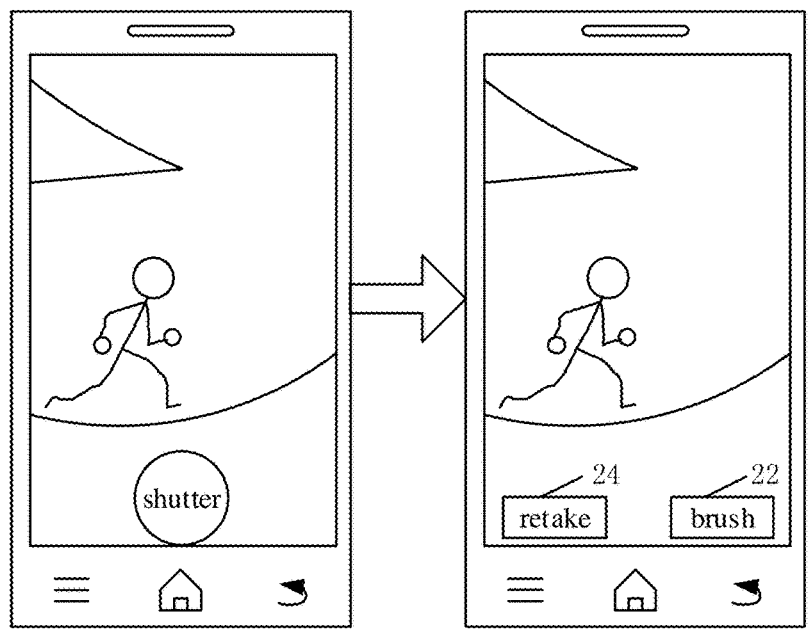
FIG. 2B is a schematic diagram of an interface for photographing a first picture with a method for capturing a picture according to another embodiment of the disclosure.

If the captured first picture is selected, the user A clicks on a "brush" button 22 shown in the lower right corner of FIG. 2B. If the captured first picture is not selected, the user A clicks on a "retake" button 24 shown in the lower left corner of FIG. 2B. As shown in FIG. 2B, the user A cannot be taken into the first picture, but a user B is taken into the first picture.

In step S202, the mobile terminal overlaps the first picture with a framed image for framing a second picture to display an overlapped picture, where transparency of the first picture is different from transparency of the framed image.

If the photographer A selects the first picture, the mobile terminal starts to find a view and prepares to capture the second picture. At this time, the mobile terminal is operated by the user B, and the user A enters into the framed image.

When framing the second picture, the mobile terminal displays the first picture on an upper layer with a first transparency, and displays the framed image for framing the second picture on a lower layer with a second transparency. The first transparency and the second transparency satisfy a relationship: 100%>the first transparency>the second transparency≥0%, where 100% transparency means full transparent.

In an embodiment of the disclosure, the first transparency and the second transparency will not be limited specifically.

Figure 2C:
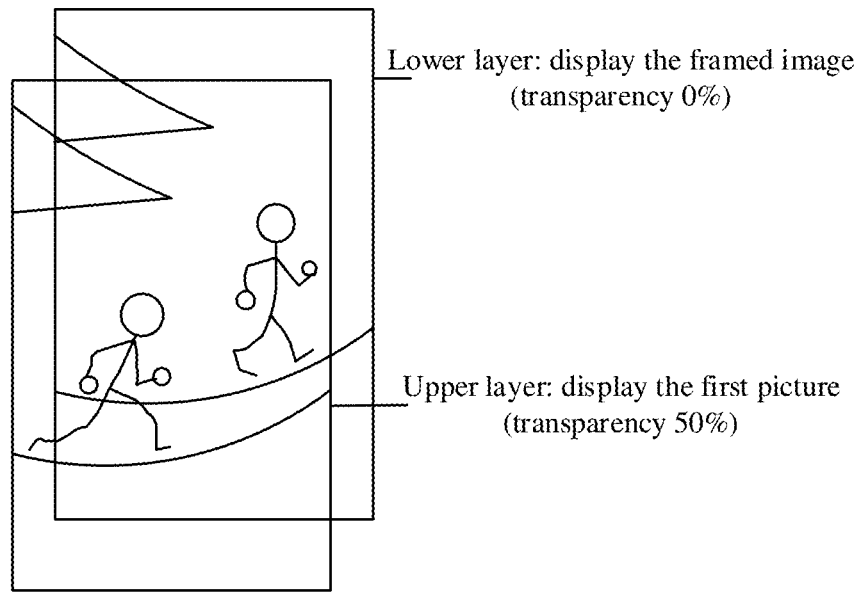
FIG. 2C is a schematic diagram of an overlappingly displayed interface according to a method for capturing a picture according to another embodiment of the disclosure.

In a possible implementation, the first transparency may be set as 50%, and the second transparency may be set as 0%, as shown in FIG. 2C.

In step S203, the mobile terminal receives a selecting signal for the first picture, where the selecting signal is used to select a target reserved region of the first picture.

The mobile terminal receives the selecting signal for the first picture which for example is input by the user B. After capturing the first picture, a region to be reserved needs to be selected from the first picture. When the reserved region is selected, the mobile terminal receives the selecting signal for the first picture.

Specifically, the mobile terminal may receive a touch retouch signal for the first picture, and a region retouched by the touch retouch signal is selected as the target reserved region.

For example, a region occupied by the user B in the first picture is selected as the target reserved region of the first picture.

It should be noted that, when the touch retouch signal for the first picture is received, the mobile terminal display a display interface in three layers. The first layer is the selected target reserved region, the second layer is the first picture with the first transparency, and the third layer is the framed image for framing the second picture.

In step S204, the mobile terminal enlarges a region determined by the selecting signal, and displays the enlarged region.

Figure 2D:
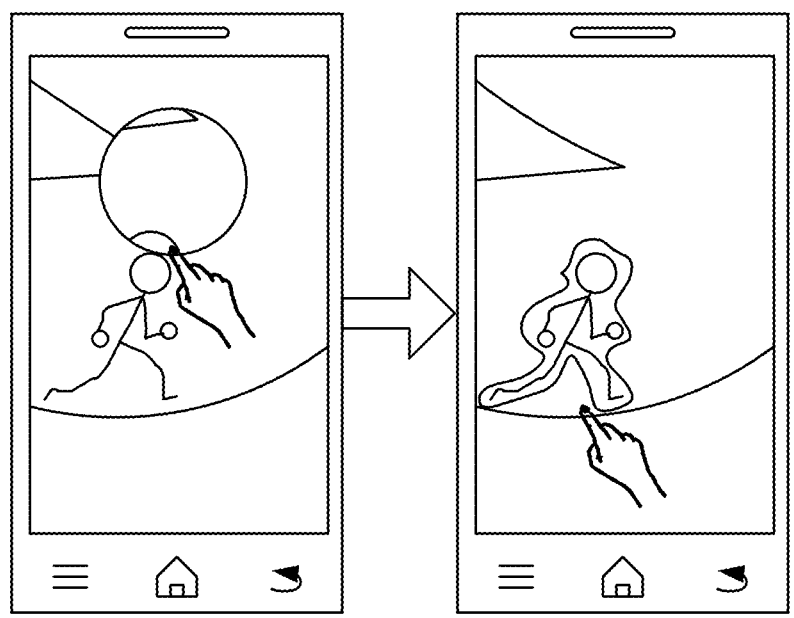
FIG. 2D is a schematic diagram of a enlargingly displayed interface according to a method for capturing a picture according to another embodiment of the disclosure.

When the selecting signal is the touch retouch signal, the mobile terminal may enlarge the region determined by the selecting signal, and display the enlarged region, when the touch retouch signal is received, as shown in FIG. 2D, such that the user B may exactly select the target reserved region.

In an embodiment of the disclosure, an enlargement factor of enlarging display will not be limited.

In a possible implementation, the enlargement factor may be set as 300%.

In step S205, the mobile terminal captures the second picture.

In a possible implementation, when a contact ratio between the framed image and the first picture is larger than a preset threshold, the mobile terminal may automatically capture the second picture. The preset threshold may be set based on practical applications.

In another possible implementation, when receiving a shoot trigger signal triggered by the user B, the mobile terminal captures the second picture.

The second picture captured by the user B may include an image of the user A.

It should be noted that, when framing the second picture, the mobile terminal may automatically perform a face recognition and focus.

In step S206, the mobile terminal combines the target reserved region of the first picture and the second picture into a picture.

The mobile terminal stores the first picture, the target reserved region of the first picture and the second picture.

Figure 2E:
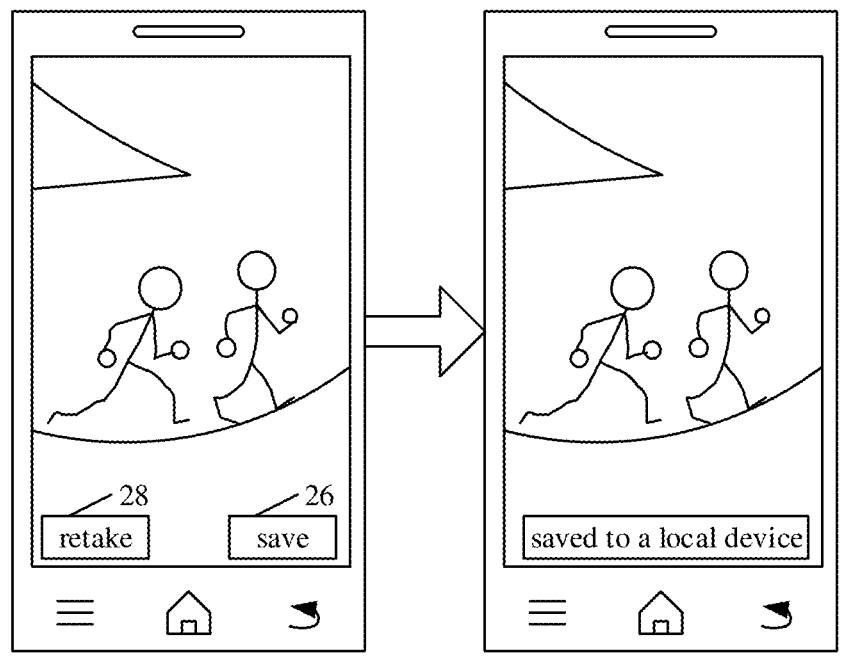
FIG. 2E is an interface schematic diagram of a composite picture according to a method for capturing a picture according to another embodiment of the disclosure.

The mobile terminal combines the target reserved region of the first picture and the second picture into one picture. As shown in FIG. 2E, if the combined picture is selected, a "save" button 26 in the lower right corner of FIG. 2E is clicked; if the combined picture is not selected, a "retake" button 28 in the lower left corner of FIG. 2E is clicked.

The target reserved region of the first picture includes the user B, the second picture includes the user A and backgrounds of the first picture and the second picture are overlapped, so the finally obtained picture includes the user A and the user B.

With the method of capturing a picture according to the embodiment, the problem of missing a target object when taking a picture of multiple people, and the problem that a picture photographed in the self-time mode cannot satisfy the desired effect are addressed. Pictures photographed in two times may be combined into one picture by using the method of capturing a picture according to the embodiment.

With the method of capturing a picture according to the embodiment, in the process of receiving the selecting signal for the first picture, the region determined by the selecting signal is enlarged and displayed. Thus, the problem that the selected target reserved region cannot be selected exactly is addressed, hence achieving the effect of exactly selecting the target reserved region and obtaining a picture of multiple target objects that reaches the demand of a photographer.

Figure 3:
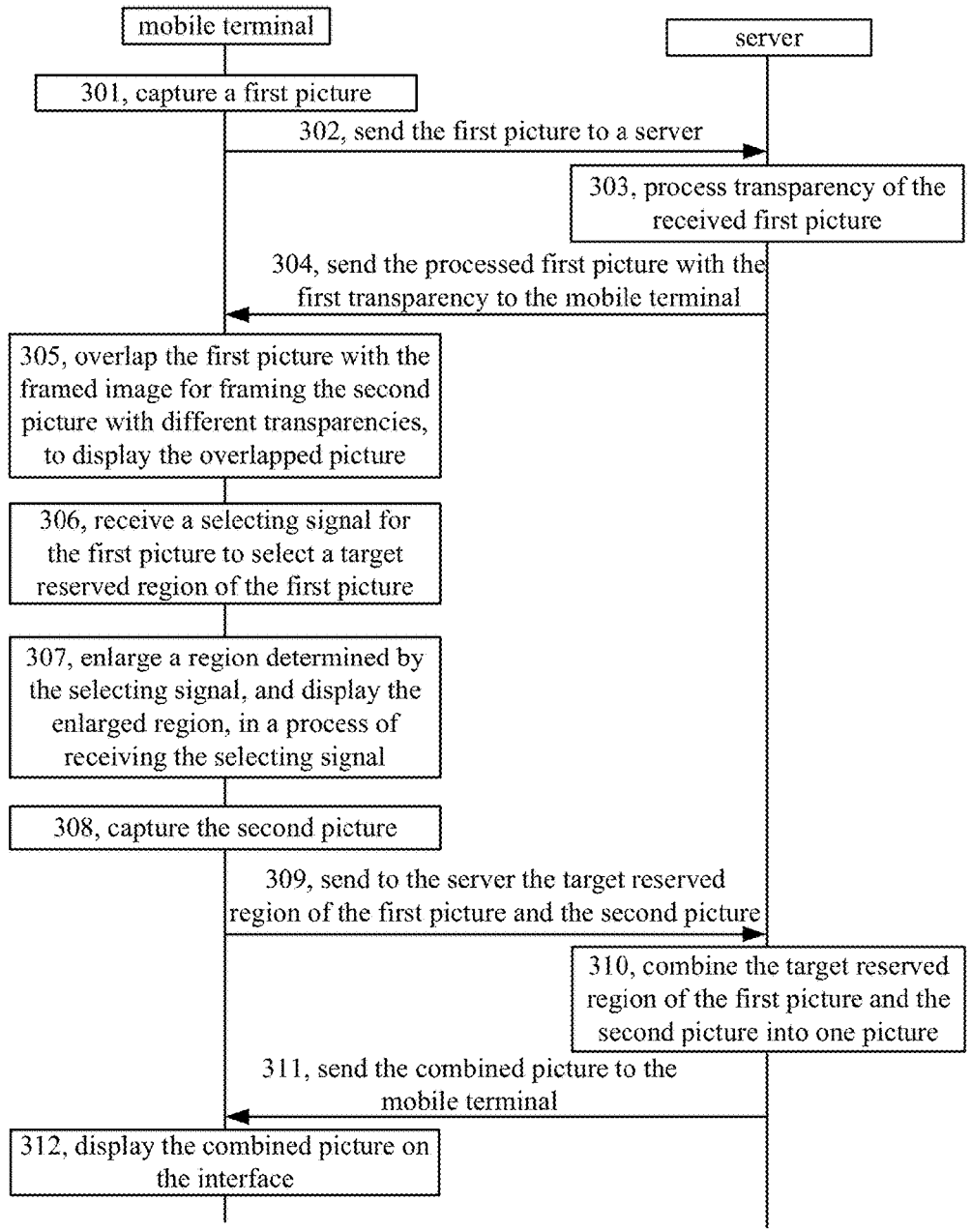
FIG. 3 is a flow chart of a method for capturing a picture according to another embodiment of the disclosure.

Reference is made to FIG. 3, which is a flow chart of a method for capturing a picture according to another embodiment of the disclosure. The method may be applied to an electronic device with a camera function and a server. The method includes steps S301 to S312.

In step S301, a mobile terminal captures a first picture.

The mobile terminal first captures the first picture according to an operation of a user A.

If the captured first picture is selected, a "brush" button in the lower right corner of the first picture is clicked; if the first picture is not selected, a "retake" button in the lower left corner of the first picture is clicked.

In the embodiment, the user A cannot be taken into the first picture, but a user B is taken into the first picture.

In step S302, the mobile terminal sends the first picture to a server.

If the photographer A selects the first picture, the mobile terminal starts to find a view and prepares to capture a second picture. At this time, the mobile terminal is operated by the user B, and the user A enters into a framed image. The mobile terminal sends the captured first picture to the server.

In step S303, the server processes transparency of the received first picture.

The server processes the first picture with the first transparency. The first transparency may be 50%.

In step S304, the server sends the processed first picture with the first transparency to the mobile terminal.

In step S305, the mobile terminal overlaps the first picture with the framed image for framing the second picture to display the overlapped picture, wherein transparency of the first picture is different from transparency of the framed image.

The mobile terminal displays the first picture on an upper layer with the first transparency, and displays the framed image for framing the second picture on a lower layer with the second transparency.

The first transparency and the second transparency satisfy a relationship: 100%>the first transparency>the second transparency≥0%, where 100% transparency means full transparent.

In an embodiment of the disclosure, the first transparency and the second transparency will not be limited specifically.

In a possible implementation, the first transparency may be set as 50%, and the second transparency may be set as 0%, where 100% transparency means full transparent.

In step S306, the mobile terminal receives a selecting signal for the first picture, where the selecting signal is used to select a target reserved region of the first picture.

The mobile terminal receives the selecting signal for the first picture which for example is input by the user B. After capturing the first picture, a target reserved region usually needs to be selected in the first picture. When the target reserved region is selected, the mobile terminal receives the selecting signal for the first picture.

Specifically, the mobile terminal may receive a touch retouch signal for the first picture, and a region retouched by the touch retouch signal is selected as the target reserved region.

For example, a region occupied by the user B in the first picture is selected as the target reserved region of the first picture.

It should be noted that, when the touch retouch signal for the first picture is received, the mobile terminal displays a display interface in three layers. The first layer is the selected target reserved region, the second layer is the first picture with the first transparency, and the third layer is the frame image for framing the second picture.

In step S307, the mobile terminal enlarges a region determined by the selecting signal, and displays the enlarged region.

When the selecting signal is the touch retouch signal, the mobile terminal may enlarge the region determined by the selecting signal, and display the enlarged region, when the touch retouch signal is received, such that the user B may exactly select the target reserved region.

In the embodiment of the disclosure, an enlargement factor of enlarging display will not be limited.

In a possible implementation, the enlargement factor may be set as 300%.

In step S308, the mobile terminal captures the second picture.

In a possible implementation, when a contact ratio between the framed image and the first picture is larger than a preset threshold, the mobile terminal may automatically capture the second picture. The preset threshold may be set based on practical applications.

In another possible implementation, when receiving a shoot trigger signal triggered by the user B, the mobile terminal captures the second picture.

The second picture captured by the user B may include an image of the user A.

It should be noted that, when framing the second picture, the mobile terminal may automatically perform a face recognition and focus.

In step S309, the mobile terminal sends to the server the target reserved region of the first picture and the second picture.

It should be noted that, in the embodiment, the mobile terminal sends to the server the target reserved region of the first picture and the second picture together. In a practical application, the target reserved region of the first picture and the second picture may be sent individually to the server.

In step S310, the server combines the target reserved region of the first picture and the second picture into one picture.

In step S311, the server sends the combined picture to the mobile terminal.

In step S312, the mobile terminal displays the combined picture.

If the combined picture is selected, a "save" button in the lower right corner is clicked; if the combined picture is not selected, a "retake" button in the lower left corner is clicked.

The region to be reserved in the first picture includes the user B, and the second picture includes the user A, and backgrounds of the first picture and the second picture are overlapped, so the finally obtained picture includes the image of the user A and an image of the user B.

With the method of capturing a picture according to the embodiment, the problem of missing a target object when taking a picture of multiple people, and the problem that a picture photographed in the self-time mode cannot satisfy the desired effect are addressed. Pictures photographed in two times may be combined into one picture by using the method of capturing a picture according to the embodiment.

With the method of capturing a picture according to the embodiment, in the process of receiving the selecting signal for the first picture, the region determined by the selecting signal is enlarged and displayed. Thus, the problem that the selected target reserved region cannot be selected exactly is addressed, hence achieving the effect of exactly selecting the target reserved region and obtaining a picture of multiple target objects that reaches the demand of a photographer.

With the method of taking a picture according to the embodiment, the mobile terminal sends the first picture to the server; the server processes transparency of the first picture; and the server sends the processed first picture with the first transparency to the mobile terminal. In this way, the problem that the mobile terminal cannot perform large volumes of data operations due to a small operational capability thereof is solved, hence achieving the effect of quickly processing a picture and improving the efficiency of picture processing.

Figure 4:
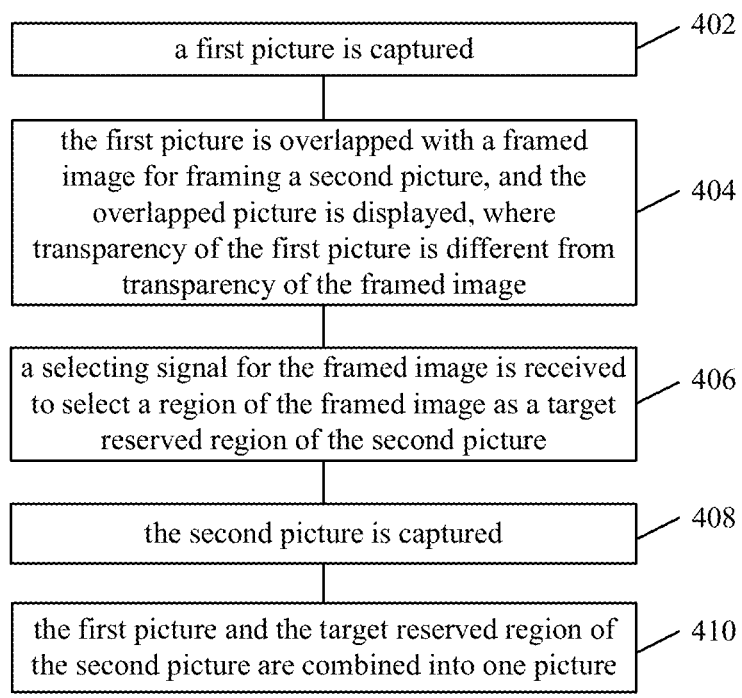
FIG. 4 is a flow chart of a method for capturing a picture according to another embodiment of the disclosure.

Reference is made to FIG. 4, which is a flow chart of a method for capturing a picture according to an embodiment of the disclosure. The method may be applied to an electronic device with a camera function such as a mobile phone and a tablet computer. The method includes steps S402 to S410.

In step S402, a first picture is captured.

In step S404, the first picture is overlapped with a framed image for framing a second picture, and the overlapped picture is displayed, where transparency of the first picture is different from transparency of the framed image.

In step S406, a selecting signal for the framed image is received to select a region of the framed image as a target reserved region of the second picture.

In step S408, the second picture is captured.

In step S410, the first picture and the target reserved region of the second picture are combined into one picture.

With the method for capturing a picture of the embodiment, the problem of missing a target object when taking a picture of multiple people, and the problem that a picture photographed in the self-time mode cannot satisfy the desired effect are addressed. Pictures photographed in two times may be combined into one picture by using the method for capturing a picture of the embodiment.

Figure 5:
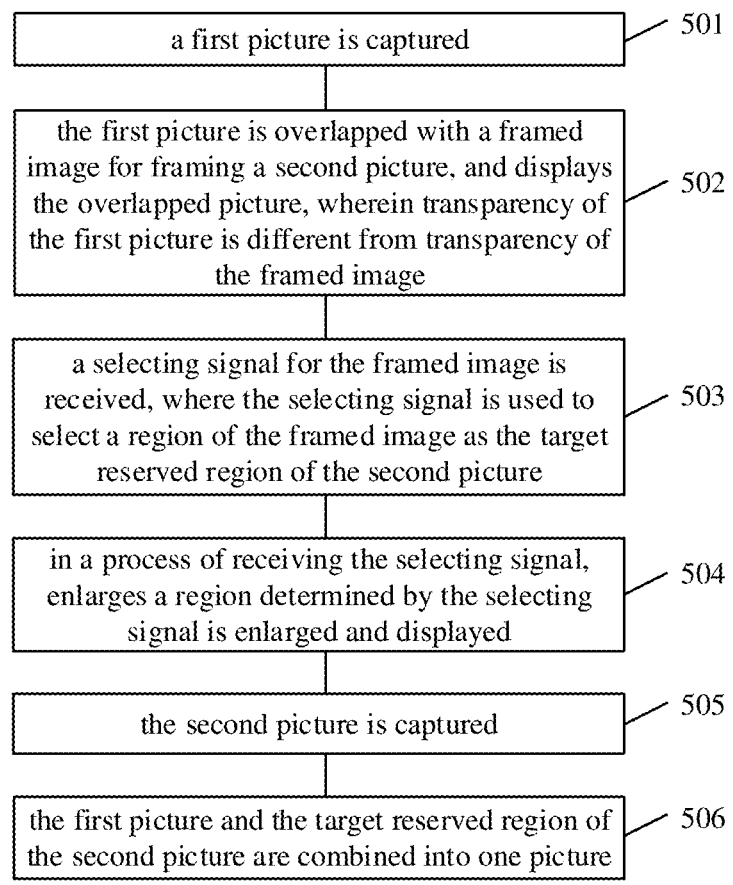
FIG. 5 is a flow chart of a method for capturing a picture according to another embodiment of the disclosure.

Reference is made to FIG. 5, which is a flow chart of a method for capturing a picture according to an embodiment of the disclosure. The method may be applied to an electronic device with a camera function such as a mobile phone and a tablet computer. In the embodiment, the method for taking a picture is taken as an example for illustration. The method includes steps S501 to S506.

In step S501, a mobile terminal captures a first picture.

The mobile terminal first captures the first picture according to an operation of a user A.

If the captured first picture is selected, a "brush" button in the lower right corner of the first picture is clicked. If the first picture is not selected, a "retake" button in the lower left corner of the first picture is clicked.

In the embodiment, the user A cannot be taken into the first picture, but a user B is taken into the first picture.

In step S502, the mobile terminal overlaps the first picture with a framed image for framing a second picture, and displays the overlapped picture, wherein transparency of the first picture is different from transparency of the framed image.

If the photographer A selects the first picture, the mobile terminal starts to find a view and prepares to capture the second picture. At this time, the mobile terminal is operated by the user B, and the user A enters into the framed image.

When framing the second picture, the mobile terminal displays the first picture on an upper layer with a third transparency, and displays the framed image for framing the second picture on a lower layer with a fourth transparency. The third transparency and the fourth transparency satisfy a relationship: 100%>the third transparency>the fourth transparency≥0%, where a 100% transparency means full transparent.

In the embodiment of the disclosure, the third transparency and the fourth transparency will not be limited specifically.

In a possible implementation, the third transparency may be set as 50%, and the fourth transparency may be set as 0%.

In step S503, the mobile terminal receives a selecting signal for the framed image, where the selecting signal is used to select a region of the framed image as the target reserved region of the second picture.

The mobile terminal receives the selecting signal for the framed image which for example is input by the user B. After capturing the first picture, the target reserved region of the second picture is usually selected at the time of capturing the second picture. When selecting the target reserved region, the mobile terminal receives the selecting signal for the framed image.

Specifically, the mobile terminal may receive a touch retouch signal for the framed image, and a region retouching by the touch retouch signal is selected as the target reserved region.

For example, a region occupied by the user A in the framed image of the second picture is selected as the target reserved region of the second picture.

It should be noted that, when the touch retouch signal for the framed image is received, the mobile terminal display a display interface in three layers. The first layer is the selected target reserved region, the second layer is the framed image with the third transparency, and the third layer is the first picture.

In step S504, the mobile terminal enlarges a region determined by the selecting signal, and displays the enlarged region.

When the selecting signal is the touch retouch signal, in order to exactly select the target reserved region by the user B, the mobile terminal may enlarge the region determined by the selecting signal and display the enlarged region, when receiving the touch retouch signal is received, such that the user B may exactly select the target reserved region.

In the embodiment of the disclosure, an enlargement factor of enlarging display will not be limited.

In a possible implementation, the enlargement factor may be set as 300%.

In step S505, the mobile terminal captures the second picture.

In a possible implementation, when a contact ratio between the framed image and the first picture is larger than a preset threshold, the mobile terminal may automatically capture the second picture. The preset threshold may be set based on practical applications.

In another possible implementation, when receiving a shoot trigger signal triggered by the user B, the mobile terminal captures the second picture.

The second picture captured by the user B may include an image of the user A.

It should be noted that, when framing the second picture, the mobile terminal may automatically perform a face recognition and focus.

In step S506, the mobile terminal combines the first picture and the target reserved region of the second picture into one picture.

The mobile terminal stores the first picture, the target reserved region of the second picture and the second picture. The mobile terminal combines the first picture and the target reserved region of the second picture into the one picture. If the combined picture is selected, a "save" button in the lower right corner of the picture is clicked; if the combined picture is not selected, a "retake" button in the lower left corner of the picture is clicked.

The first picture includes the user B, the target reserved region of the second picture includes the user A, and backgrounds of the first picture and the second picture are overlapped, so the finally obtained picture includes the image of the user A and an image of the user B.

With the method of capturing a picture according to the embodiment, the problem of missing a target object when taking a picture of multiple people, and the problem that a picture photographed in the self-time mode cannot satisfy the desired effect are addressed.

Pictures photographed in two times may be combined into one picture by using the method of capturing a picture according to the embodiment.

With the method of capturing a picture according to the embodiment, in the process of receiving the selecting signal for the framed image of the second picture, the region determined by the selecting signal is enlarged and displayed. Thus, the problem that the selected target reserved region cannot be selected exactly is addressed, hence achieving the effect of exactly selecting the target reserved region and obtaining a picture of multiple target objects that reaches the demand of a photographer.

Figure 6:
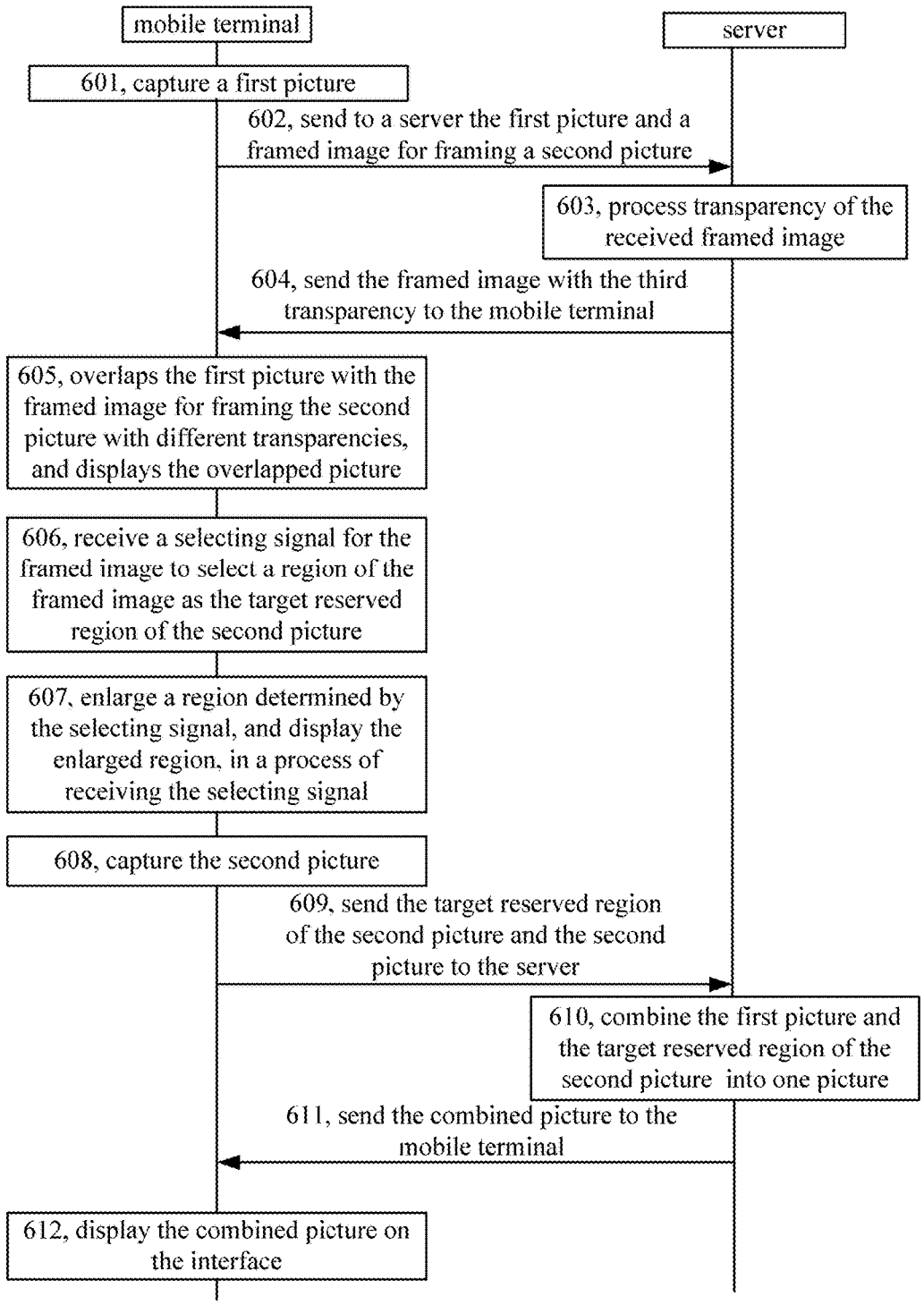
FIG. 6 is a flow chart of a method for capturing a picture according to another embodiment of the disclosure.

Reference is made to FIG. 6, which is a flow chart of a method for capturing a picture according to another embodiment of the disclosure. The method may be applied to an electronic device with a camera function and a server. The method includes steps S601 to S612.

In step S601, a mobile terminal captures a first picture.

A mobile terminal first captures the first picture according to an operation of a user A.

If the captured picture is selected, a "brush" button in the lower right corner of the picture is clicked; if the picture is not selected, a "retake" button in the lower left corner of the picture is clicked.

In the embodiment, the user A cannot be taken into the first picture, but a user B is taken into the first picture.

In step S602, a mobile terminal sends to a server the first picture and a framed image for framing a second picture.

If the photographer A selects to use the first picture, the mobile terminal starts to find a view and prepares to capture a second picture. At this time, the mobile terminal is operated by the user B, and the user A enters into the framed image. The mobile terminal sends to the server the photographed first picture and the framed image for framing the second picture.

In step S603, the server processes transparency of the received framed image.

The server processes the framed image with a third transparency. The third transparency may be 50%.

In step S604, the server sends the framed image with the third transparency to the mobile terminal.

In step S605, the mobile terminal overlaps the first picture with the framed image for framing the second picture with different transparencies, and displays the overlapped picture.

The mobile terminal displays the framed image on an upper layer with the third transparency, and displays the first picture on a lower layer with a fourth transparency.

The third transparency and the fourth transparency satisfy a relationship: 100%>the third transparency>the fourth transparency≥0%, where 100% transparency means full transparent.

In an embodiment of the disclosure, the third transparency and the fourth transparency will not be limited specifically.

In a possible implementation, the third transparency may be set as 50%, and the fourth transparency may be set as 0%.

In step S606, the mobile terminal receives a selecting signal for the framed image to select a region of the framed image as the target reserved region of the second picture.

The mobile terminal receives the selecting signal for the framed image, which for example is input by the user B. After capturing the first picture, a target reserved region of the second picture usually needs to be selected. When the target reserved region is selected, the mobile terminal receives the selecting signal for the framed image.

Specifically, the mobile terminal may receive a touch retouch signal for the framed image, and a region retouched by the touch retouch signal is selected as the target reserved region.

For example, a region occupied by the user B in the second picture is selected as the target reserved region of the second picture.

It should be noted that, when the touch retouch signal for the framed image is selected, the mobile terminal displays a display interface in three layers. The first layer is the selected target reserved region, the second layer is the framed image with the third transparency, and the third layer is the first picture.

In step S607, the mobile terminal enlarges a region determined by the selecting signal, and displays the enlarged region.

When the selecting signal is the touch retouch signal, the mobile terminal may enlarge the region determined the selecting signal and display the enlarged region, when the touch retouch signal is received, such that the user B may exactly select the target reserved region.

In the embodiment of the disclosure, an enlargement factor of enlarging display will not be limited.

In a possible implementation, the enlargement factor may be set as 300%.

In step S608, the mobile terminal captures the second picture.

In a possible implementation, when a contact ratio between the framed image and the first picture is larger than a preset threshold, the mobile terminal may automatically capture the second picture. The preset threshold may be set based on practical applications.

In another possible implementation, when receiving a shoot trigger signal triggered by the user B, the mobile terminal captures the second picture.

The second picture captured by the user B may include an image of the user A.

It should be noted that, when framing the second picture, the mobile terminal may automatically perform a face recognition and focus.

In step S609, the mobile terminal sends the target reserved region of the second picture and the second picture to the server.

It should be noted that, in the embodiment, the mobile terminal sends to the server the target reserved region of the second picture and the second picture together. In practical applications, the target reserved region of the second picture and the second picture may be sent individually to the server.

In step S610, the server combines the target reserved region of the second picture and the second picture into one picture.

In step S611, the server sends the combined picture to the mobile terminal.

In step S612, the mobile terminal displays the combined picture.

If the combined picture is selected, a "save" button in the lower right corner of the combined picture is clicked; if the combined picture is not selected, a "retake" button in the lower left corner of the combined picture is clicked.

The target reserved region of the first picture includes the user B, the second picture includes the user A, and backgrounds of the first picture and the second picture are overlapped, so the finally obtained picture includes the image of the user A and an image of the user B.

With the method of capturing a picture according to the embodiment, the problem of missing a target object when taking a picture of multiple people, and the problem that a picture photographed in the self-time mode cannot satisfy the desired effect are addressed. Pictures photographed in two times may be combined into one picture by using the method of capturing a picture according to the embodiment.

With the method of capturing a picture according to the embodiment, in the process of receiving the selecting signal for the framed image of the second picture, the region determined by the selecting signal is enlarged and displayed. Thus, the problem that the selected target reserved region cannot be selected exactly is solved, hence achieving the effect of exactly selecting the target reserved region and obtaining a picture of multiple target objects that reaches the demand of a photographer.

With the method of taking a picture according to the embodiment, the mobile terminal sends the first picture and the framed image of the second picture to the server. The server processes transparency of the framed image; and sends the processed framed image with the third transparency to the mobile terminal. In this way, the problem that the mobile terminal cannot perform large volumes of data operations due to a small operational capability thereof is solved, hence achieving the effect of quickly processing a picture and improving the efficiency of picture processing.

Figure 7:
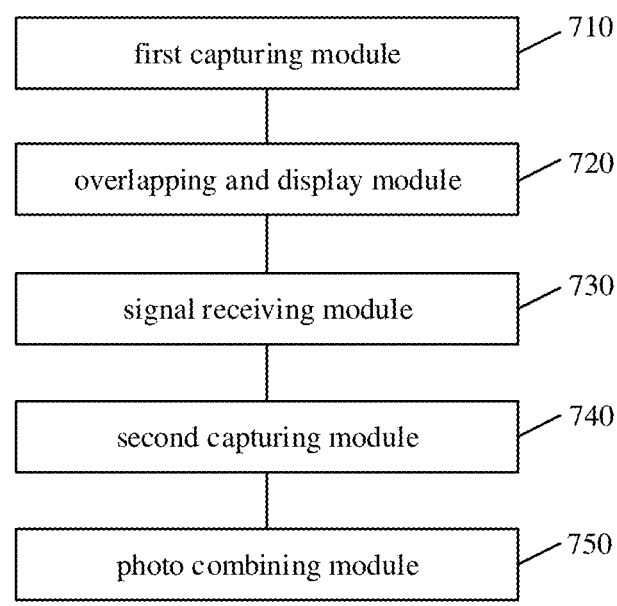
FIG. 7 is a structural block diagram of a device for capturing a picture according to an embodiment of the disclosure.

Reference is made to FIG. 7, which is a structure block diagram of a device for capturing a picture according to an embodiment of the disclosure. In the embodiment, for example, the device for capturing the picture is applied to a mobile terminal. The device for capturing the picture may be a whole or a part of the terminal by any one or a combination of using software and hardware. The device includes a first capturing module 710, an overlapping and display module 720, a signal receiving module 730, a second capturing module 740 and a photo combining module 750.

The first capturing module 710 is configured to capture a first picture.

The overlapping and display module 720 is configured to overlap the first picture and a framed image for framing a second picture, and display the overlapped picture, where transparency of the first picture is different from transparency of the framed image.

The signal receiving module 730 is configured to receive a selecting signal to select a target reserved region of the first picture, or to select a region of the framed image as a target reserved region of the second picture.

The second capturing module 740 is configured to capture a second picture.

The photo combining module 750 is configured to combine the target reserved region of the first picture and the second picture into one picture, or combining the first picture and the target reserved region of the second picture into one picture.

By using the device for capturing the picture according to embodiment, the problem of missing a target object when taking a picture of multiple people, and the problem that a picture photographed in the self-time mode cannot satisfy the desired effect are addressed. Pictures photographed in two times may be combined into one picture by using the device for capturing a picture of the embodiment.

Figure 8:
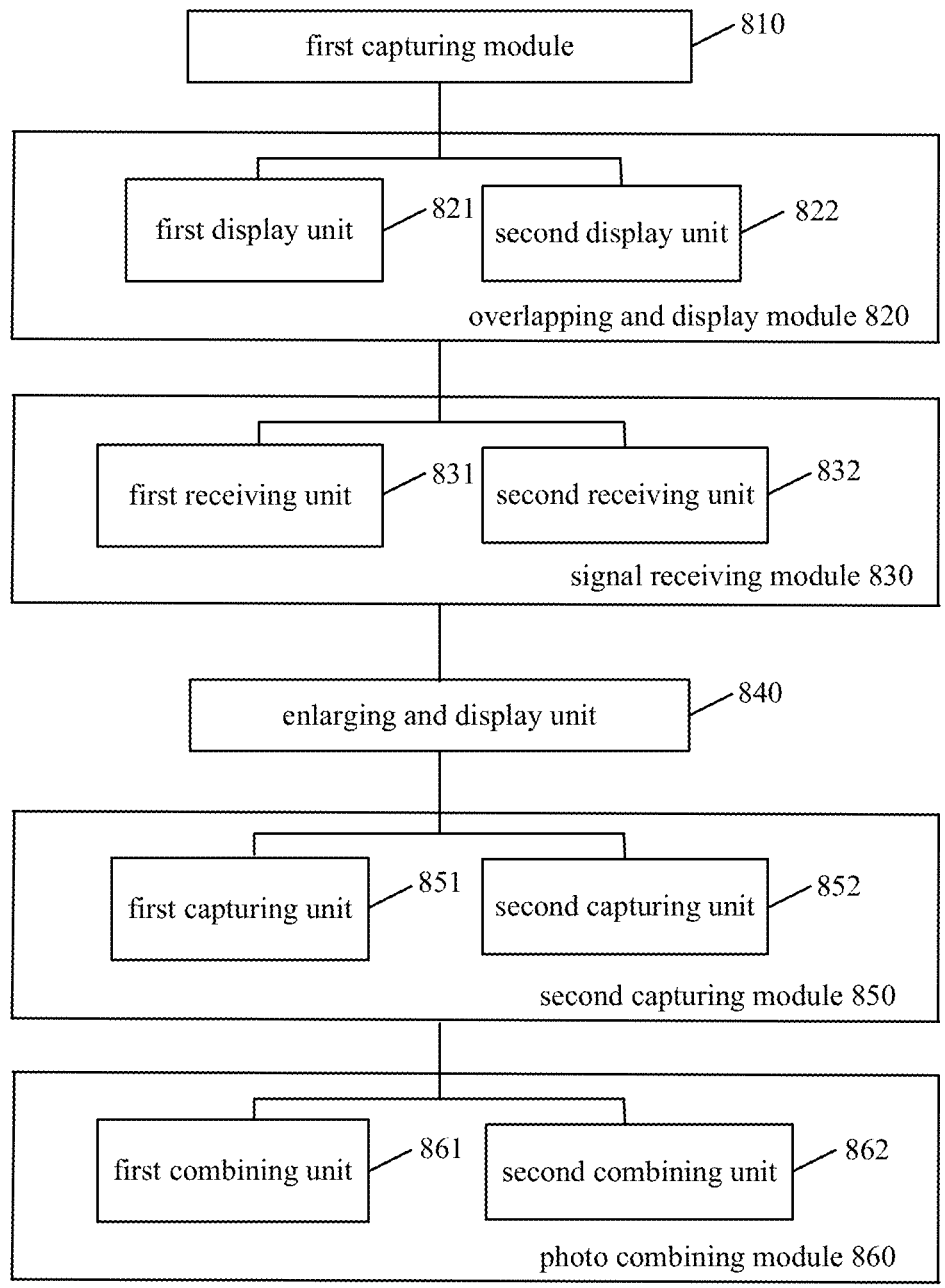
FIG. 8 is a structural block diagram of a device for capturing a picture according to another embodiment of the disclosure.

Reference is made to FIG. 8, which is a structure block diagram of a device for capturing a picture according to another embodiment of the disclosure. In the embodiment, for example, the device for capturing a picture is applied to a mobile terminal. The device for capturing the picture may be a whole or a part of the terminal by using any one or a combination of software and hardware. The device includes a first capturing module 810, an overlapping and display module 820, a signal receiving module 830, an enlarging and display unit 840, a second capturing module 850 and a photo combining module 860.

The first capturing module 810 is configured to capture a first picture.

The overlapping and display module 820 is configured to overlap the first picture with a framed image for framing a second picture, and display the overlapped picture, where transparency of the first picture is different from transparency of the framed image.

The overlapping and display module 820 includes a first display unit 821 or a second display unit 822.

The first display unit 821 is configured to display the first picture on an upper layer with a first transparency, and display the framed image on a lower layer with a second transparency, where the first transparency and the second transparency satisfy a relationship: 100%>the first transparency>the second transparency≥0%, where 100% transparency means full transparent.

The second display unit 822 is configured to display the framed image on an upper layer with a third transparency, and display the first picture on a lower layer with a fourth transparency, where the third transparency and the fourth transparency satisfy a relationship: 100%>the third transparency>the fourth transparency≥0%, where 100% transparency means full transparent.

The signal receiving module 830 is configured to receive a selecting signal to select a target reserved region of the first picture, or to select a region of the framed image as a target reserved region of the second picture. The signal receiving module 830 includes a first receiving unit 831 or a second receiving unit 832.

The first receiving unit 831 is configured to receive a touch retouch signal for the first picture, and select a region determined by the touch retouch signal as the target reserved region of the first picture.

The second receiving unit 832 is configured to receive a touch retouch signal for the second picture, and select a region determined by the touch retouch signal as the target reserved region of the second picture.

The enlarging and display unit 840 is configured to enlarge the region determined by the touch retouch signal and display the enlarged region, in a process of receiving the touch retouch signal.

In the embodiment of the disclosure, an enlargement factor of enlarging display will not be limited.

In a possible implementation, the enlargement factor may be set as 300%.

The second capturing module 850 is configured to capture a second picture.

The second capturing module 850 includes a first capturing unit 851 or a second capturing unit 852.

The first capturing unit 851 is configured to capture the second picture, in a case that a contact ratio between the framed image and the first picture is larger than a preset threshold, where the preset threshold may be set based on practical applications.

The second capturing unit 852 is configured to capture the second picture, when a shoot trigger signal is received.

The photo combining module 860 is configured to combine the target reserved region of the first picture and the second picture into one picture, or combining the first picture and the target reserved region of the second picture into one picture.

The photo combining module 860 includes a first combining unit 861 or a second combining unit 862.

The first combining unit 861 is configured to send to the server the first picture, the target reserved region of the first picture and the second picture, such that the server combines the first picture and the target reserved region of the first picture into one picture; and receive the combined picture from the server.

The second combining unit 862 is configured to send to the server the first picture, the target reserved region of the second picture and the second picture, such that the server combines the first picture and the target reserved region of the second picture into one picture; and receive the combined picture from the server.

By using the device of capturing a picture according to the embodiment, the problem of missing a target object when taking a picture of multiple people, the problem that a picture photographed in the self-time mode cannot satisfy the desired effect are addressed. The pictures photographed in two times may be combined into one picture by using the device of capturing a picture according to the embodiment.

With the device of capturing a picture according to the embodiment, in the process of receiving the selecting signal, the region determining by the selecting signal is enlarged and displayed. Thus, the problem that the selected target reserved region cannot be selected exactly is resolved, hence achieving the effect of exactly selecting the target reserved region and obtaining a picture of multiple target objects that reaches the demand of a photographer.

Figure 9:
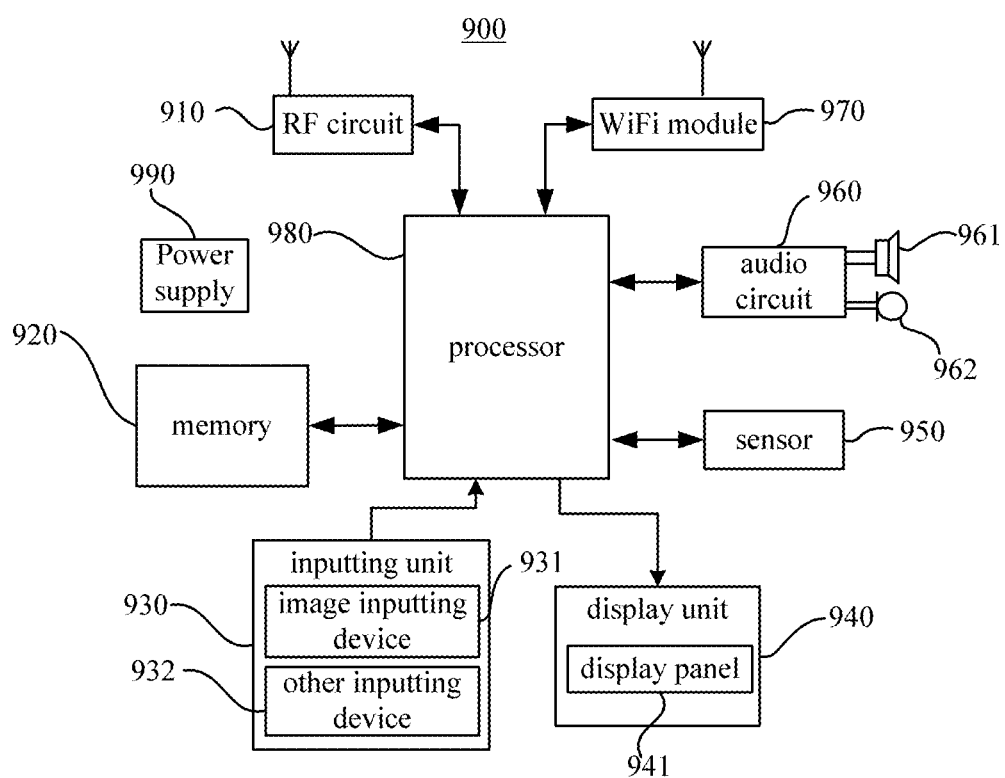
FIG. 9 is a structural block diagram of a mobile terminal according to an embodiment of the disclosure.

Reference is made to FIG. 9, which is a schematic structural diagram of a mobile terminal according to an embodiment of the disclosure. The mobile terminal is configured to implement the method for capturing the picture in the above embodiments.

A mobile terminal 900 may include a RF (Radio Frequency) circuit 910, a memory 920 including one or more computer readable storage media, an inputting unit 930, a display unit 940, a sensor 950, an audio circuit 960, a WiFi (wireless fidelity) module 970, a processor 980 including one or more processing cores, a power supply 990, and so on. Those skilled in the art may understand that the structure of the terminal device is not limited to the structure illustrated in FIG. 9. The technical solution according to the present disclosure may include more or less components as compared with the components illustrated in FIG. 9, or have some components combined, or use a different arrangement of the components.

The RF circuit 910 may be configured to receive and send information, or to receive and send signals in a call. Specifically, the RF circuit delivers the downlink information received from a base station to one or more processors 980 for processing, besides, transmits designed uplink data to the base station. Generally, the RF circuit 910 includes but not limited to an antenna, at least one amplifier, a tuner, one or more oscillators, a subscriber identity module (SIM) card, a transceiver, a coupler, a LNA (Low Noise Amplifier), and a duplexer, etc. In addition, the RF circuit 910 may communicate with other devices and network via wireless communication. The wireless communication may use any communication standard or protocol, including but not limited to GSM (Global System of Mobile communication), GPRS (General Packet Radio Service), CDMA (Code Division Multiple Access), WCDMA (Wideband Code Division Multiple Access), LTE (Long Term Evolution), E-mail, and SMS (Short Messaging Service), and so on.

The memory 920 may be configured to store software programs and modules, and the processor 980 performs various functional applications and data processing by running the software programs and modules stored in the memory 920. The memory 920 may mainly include a program storing region and a data storing region, where the program storing region may store an operating system, an application program which is needed by at least one function (such as an audio playing function and an image playing function); and the data storing region may store data established based on use of the mobile terminal 900 (such as audio data and a phone book). In addition, the memory 920 may include a high speed random access memory, and may also include a non-volatile memory such as at least one magnetic disk storage device or a flash memory device, or other volatile solid-state memory device. Correspondingly, the memory 920 may further include a memory controller configured to provide access to the memory 920 for the processor 980 and the inputting unit 930.

The inputting unit 930 may be configured to receive an inputted number or character information, and generate a signal related to user setting and function controlling, which is inputted with a keyboard, a mouse, an operating rod or a trackball, or an optical input. Specifically, the inputting unit 930 may include an image inputting device 931 and other inputting device 932. The image inputting device 931 may be a camera, or an optoelectric scanning device. In addition to the image inputting device 931, the inputting unit 930 may further include the other inputting device 932. Specifically, the other inputting device 932 may include, but is not limited to, one or more of a physical keyboard, a function button (such as a volume controlling button or a switch button), a trackball, a mouse, an operating rod and so on.

The display unit 940 may be configured to display information inputted by the user or provided for the user, and various graphic user interfaces of the terminal device 900. The graphic user interfaces may consist of graphs, text, icons, videos and any combination thereof. The display unit 940 may include a display panel 941. Optionally, the display panel 941 may be configured in a form of LCD (Liquid Crystal Display), or OLED (Organic Light-Emitting Diode) and so on.

The terminal device 900 may further include the at least one sensor 150, such as a light sensor, a motion sensor and other sensor. Specifically, the light sensor may include an ambient light sensor and a proximity sensor, where the ambient light sensor may adjust brightness of the display panel 941 based on brightness of ambient light, and the proximity sensor may close the display panel 941 and/or backlight in a case that the terminal device 900 moves to an ear. As one of motion sensors, a gravity acceleration sensor may detect magnitude of an accelerated rate in each of directions (there are usually three axes), detect magnitude and a direction of gravity while at rest, and be applied to an application which recognize a gesture of the mobile phone (such as switching between portrait and landscape orientation, a related game or magnetometer calibration) and to a function related to vibration recognition (such as a pedometer or a click); and other sensor which may be provided for the terminal device 900, such as a gyroscope, a barometer, a hygrometer, a thermometer or an infrared sensor, is not described herein.

The audio circuit 960, a speaker 961 and a microphone 962 may provide an audio interface between the user and the terminal device 900. The audio circuit 960 may send a signal, converted from received audio data, to the speaker 961, and then the speaker 961 converts it into an audio signal for outputting; on the other hand, the microphone 962 converts a collected audio signal to an electrical signal, the electrical signal is received by the audio circuit 960 and then converted into audio data, and after the audio data is processed by the processor 980, the audio data is sent to another terminal device via the RF circuit 910, or the audio data is outputted to the memory 920 for further processing. The audio circuit 960 may further include a headphone jack, so as to provide communications between a peripheral headphone and the terminal device 900.

WiFi belongs to a short-distance wireless transmission technology, the terminal device 900 may help the user receive and send emails, browse a webpage, and access to streaming media, with the wireless communication unit 970, and it provides wireless broadband internet access for the user. Although the wireless communication unit 970 is illustrated in FIG. 6, it can be understood that the wireless communication unit 970 is not a necessary constituent of the terminal device 900, and may be omitted based on requirements without changing essence of the present disclosure.

The processor 980 is a control center of the terminal device 800, which connects each part of the mobile phone with interfaces and circuits, and performs the functions of the terminal device 900 and the data processing, by running or executing the software programs or modules stored in the memory 920 and calling data stored in the memory 920, thereby realizing overall monitoring of the mobile phone. Optionally, the processor 980 may include one or more processing cores; preferably, the processor 980 may integrate an application processor and a modem processor, the application processor is mainly configured to process operating systems, user interfaces and applications, and the modem processor is mainly configured to process wireless communications. It can be understood that the modem processor may not be integrated into the processor 980.

The terminal device 900 further includes the power supply 990 (such as a battery) configured to power all the components, Preferably, the power supply may be logically connected with the processor 980 via a power supply management system, so that management of functions such as charging, discharging and power managing, can be realized with the power supply management system. The power supply 990 may further include one or more direct current or alternating current power supplies, a rechargeable system, a power fault detection circuit, a power adapter or inverter, a power status indicator, and so on.

Not shown in the figure, however, the terminal device 900 may further include a bluetooth module, which is not described herein.

In specific embodiments, the mobile terminal 900 further includes a storage, one or more programs, which is stored in the storage, and is executed by one or more processors via configuration. The above one or more programs include implementing the method for capturing a picture in the above embodiment.

It should be understood that, when the device for capturing a picture provided by the above-described embodiments photographs, only dividing the above function modules is taken for example; and the above functions may be achieved by to different allocated function modules, namely, the internal structure of the device is divided into different function modules so as to achieve the whole or a part of the above-described functions. In addition, the device for capturing a picture of the above-described embodiments belongs to a same concept as the method for capturing a picture, the specific implementation process refers to embodiments about the method, which is not described herein.

The number in the embodiments according to the disclosure is only used for description, and does not indicate advantages or disadvantages of the embodiments.

The person of ordinary skill in the art may understand that all or part of steps realizing the above-described embodiments may be completed by hardware, or by instructing the corresponding hardware by programs. All of the programs may be stored in a computer readable storage medium. The above-mentioned storage medium may be a read-only memory, a disk or a CD, etc.

The foregoing embodiments are only preferred embodiments of the disclosure and are not meant to limit the disclosure. All modifications, equivalent variations and improvements made without departing from the spirit and principle of the disclosure shall fall in the scope of the technical solutions of the disclosure.

The invention claimed is:

1. A method for capturing a picture, comprising:
    capturing, by a mobile terminal, a first picture;
    forming, by the mobile terminal, a framed image for framing a second picture;
    overlapping, by the mobile terminal, the first picture with the framed image for framing the second picture;
    displaying, by the mobile terminal, the overlapped first and second pictures, wherein transparency of the first picture is different from transparency of the framed image;
    receiving, by the mobile terminal, a selecting signal to select a target reserved region from the displayed first picture;
    capturing, by the mobile terminal, the second picture in response to receiving a shoot trigger signal; and
    combining, by the mobile terminal, the target reserved region of the first picture and the second picture into one picture.

2. The method according to claim 1, wherein displaying the overlapped first and second pictures comprises:

displaying the first picture on an upper layer, and displaying the framed image on a lower layer, wherein transparency of the first picture is larger than transparency of the framed image.

3. The method according to claim 1, wherein receiving the selecting signal comprises:
receiving a touch retouch signal for the first picture, and selecting a region determined by the touch retouch signal as the target reserved region of the first picture.

4. The method according to claim 3, further comprising:
enlarging the region determined by the touch retouch signal, and displaying the enlarged region.

5. The method according to claim 1, further comprising:
displaying the combined picture; and/or
storing the combined picture.

6. The method according to claim 1, further comprising:
displaying a display interface in three layers, wherein the first layer is the selected target reserved region, the second layer is the first picture, and the third layer is the framed image for framing the second picture.

7. A device for capturing a picture, comprising: a capturing module, a processor and a storage medium storing operation instructions, wherein the processor is configured to execute the operation instructions stored in the storage medium to:
control the capturing module to capture a first picture;
control the capturing module to form a framed image for framing a second picture;
overlap the first picture with the framed image for framing the second picture;
display the overlapped first and second pictures, wherein transparency of the first picture is different from transparency of the framed image;
receive a selecting signal to select a target reserved region from the displayed first picture;
control the capturing module to capture the second picture in response to receiving a shoot trigger signal; and
combine the target reserved region of the first picture and the second picture into one picture.

8. The device according to claim 7, wherein the processor is further configured to execute the operation instructions to:
display the first picture on an upper layer, and display the framed image on a lower layer, wherein transparency of the first picture is larger than transparency of the peep-sight scene.

9. The device according to claim 7, wherein the processor is further configured to execute the operation instructions to:
receive a touch retouch signal for the first picture, and select a region determined by the touch retouch signal as the target reserved region of the first picture.

10. The device according to claim 9, wherein the processor is further configured to execute the operation instructions to:
enlarge the region determined by the touch retouch signal, and display the enlarged region.

11. The device according to claim 7, wherein the processor is further configured to execute the operation instructions to:
display the combined picture; and/or
store the combined picture.

12. The device according to claim 7, wherein the processor is further configured to execute the operation instructions to:
display a display interface in three layers, wherein the first layer is the selected target reserved region, the second layer is the first picture, and the third layer is the framed image for framing the second picture.

13. A mobile terminal, comprising a device for capturing a picture, wherein the device for capturing the picture comprises: a capturing module, a processor and a storage medium storing operation instructions, wherein the processor is configured to execute the operation instructions stored in the storage medium to:
control the capturing module to capture a first picture;
control the capturing module to form a framed image for framing a second picture;
overlap the first picture with the framed image for framing the second picture;
display the overlapped first and second pictures, wherein transparency of the first picture is different from transparency of the framed image;
receive a selecting signal to select a target reserved region from the displayed first picture;
control the capturing module to capture the second picture in response to receiving a shoot trigger signal; and
combine the target reserved region of the first picture and the second picture into one picture.

14. The mobile terminal according to claim 13, wherein the processor is further configured to execute the operation instructions to:
display the first picture on an upper layer, and display the framed image on a lower layer, wherein transparency of the first picture is larger than transparency of the peep-sight scene.

15. The mobile terminal according to claim 13, wherein the processor is further configured to execute the operation instructions to:
receive a touch retouch signal for the first picture, and select a region determined by the touch retouch signal as the target reserved region of the first picture.

16. The mobile terminal according to claim 15, wherein the processor is further configured to execute the operation instructions to:
enlarge the region determined by the touch retouch signal, and display the enlarged region.

17. The mobile terminal according to claim 13, wherein the processor is further configured to execute the operation instructions to:
display the combined picture; and/or
store the combined picture.

18. The mobile terminal according to claim 13, wherein the processor is further configured to execute the operation instructions to:
display a display interface in three layers, wherein the first layer is the selected target reserved region, the second layer is the first picture, and the third layer is the framed image for framing the second picture.

* * * * *

UNITED STATES PATENT AND TRADEMARK OFFICE
CERTIFICATE OF CORRECTION

PATENT NO. : 10,122,942 B2
APPLICATION NO. : 15/870320
DATED : November 6, 2018
INVENTOR(S) : You Zhou Page 1 of 1

It is certified that error appears in the above-identified patent and that said Letters Patent is hereby corrected as shown below:

In the Specification

Column 1, Line 5, change "Jan. 14," to --Jan. 24,--.

Column 14, Line 55, change "optoelectric" to --optoelectronic--.

Column 15, Line 66, change "components," to --components.--.

Signed and Sealed this
Sixteenth Day of April, 2019

Andrei Iancu
*Director of the United States Patent and Trademark Office*